E. NUEBLING.
HELICAL PISTON WHEEL.
APPLICATION FILED JULY 27, 1915.
1,233,599.
Patented July 17, 1917.
2 SHEETS—SHEET 1.
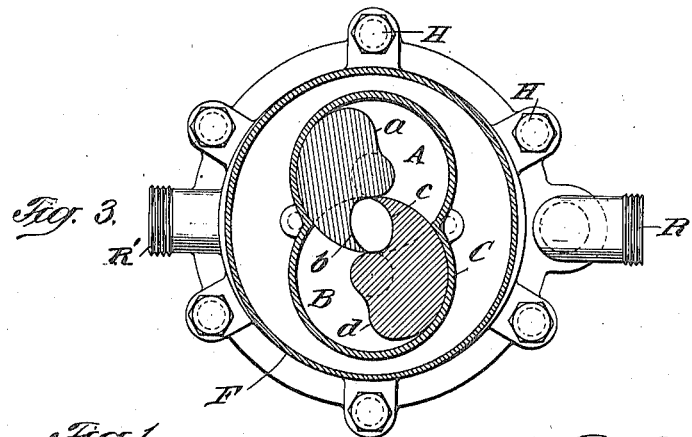
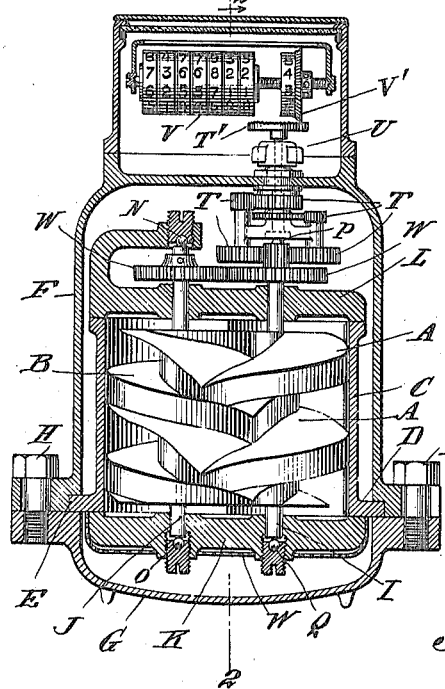
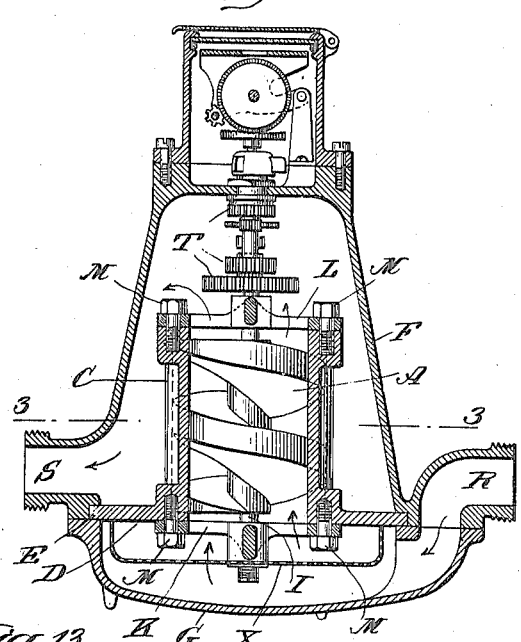
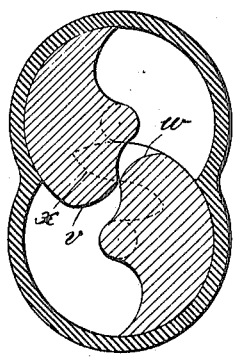
WITNESSES:
INVENTOR
Edward Nuebling
BY
ATTORNEY

E. NUEBLING.
HELICAL PISTON WHEEL.
APPLICATION FILED JULY 27, 1915.

1,233,599.

Patented July 17, 1917.
2 SHEETS—SHEET 2.

WITNESSES:

INVENTOR
Edward Nuebling
BY
ATTORNEY

UNITED STATES PATENT OFFICE.

EDWARD NUEBLING, OF NEW YORK, N. Y.

HELICAL PISTON-WHEEL.

1,233,599.  Specification of Letters Patent.  Patented July 17, 1917.

Application filed July 27, 1915.  Serial No. 42,231.

*To all whom it may concern:*

Be it known that I, EDWARD NUEBLING, a citizen of the United States, and a resident of New York, in the county of New York and State of New York, have invented new and useful Improvements in Helical Piston-Wheels, of which the following is a specification.

My invention relates to devices for receiving the pressure of, or for operating upon, a fluid in a cylinder or casing and has for its object to provide tooth-outlines, for helical piston wheels, of simple and practical construction that will prevent slippage past the piston wheels when exposed on their opposite sides to different fluid pressures.

It is particularly adapted to types of pumps, motors and measuring apparatus in which are employed one or more pairs of meshing helical piston wheels or screws mounted on parallel shafts and rotating within a chamber or case which closely fits the perimeters of the wheels.

When fluid acts upon one side of a pair of such wheels rotation is accomplished by the pressure of the fluid against the sides of the teeth or pistons as the fluid progresses from the inlet to the outlet sides of the chamber.

As heretofore constructed in order that the wheels would mesh excessive clearances had to be allowed for in the tooth outline of helical piston wheels, as a consequence of which undue leakage or backward slip took place. This has been especially so when the depth of tooth (that is, its radial dimension) has been large as compared with the outer diameter of the screws and particularly when operating the wheels at slow speed under a large difference in pressure on opposite sides of the screws.

The present invention consists in providing tooth outlines which are of such shape as to effectively seal the piston wheels against leakage or backward slip for any relative position they may assume in rotation and which shall be equally effective for any ratio of depth of tooth to diameter of wheels and for any pitch or lead.

The invention is illustrated in the accompanying drawings, in which Figure 1 is a longitudinal sectional elevation of one embodiment of my invention applied to a measuring apparatus.

Fig. 2 is a longitudinal sectional elevation on line 2—2 of Fig. 1.

Fig. 3 is a transverse sectional detail on the line 3—3 of Fig. 2.

Fig. 13 is a transverse sectional detail of a pair of helical piston wheels having a tooth-outline modified from that shown in the foregoing figures, which however accomplishes the same purpose.

In Fig. 1, A and B represent a pair of meshing helical piston wheels in which the tooth of wheel A is cut in a right-hand helical or screw-like path and the tooth of wheel B in a left-hand helical or screw-like path.

Wheels A and B are fitted into a (wheel) chamber C which has the shape of two intersecting hollow cylinders whose axes are parallel, with the intersecting portions of the cylinder walls removed.

An annular web D at the bottom of the wheel chamber C accurately fits into a recess E of the main casing F.

The wheel chamber C is securely held in position by the bottom cover G which is bolted to the main casing F by means of a plurality of bolts H.

The shafts or hubs I and J of the helical piston wheels A and B are carried by the bearing brackets K and L which serve to maintain the alinement between the wheel chamber C and the helical piston wheels A and B.

The bearing brackets K and L are secured to the wheel chamber C by means of the screws M. P is a fixed ball bearing and Q an adjustable ball bearing for the shaft I of wheel A. N and O are adjustable ball bearings for the shaft J of wheel B which serve for the longitudinal or axial adjustment of the wheel.

Figure 10:
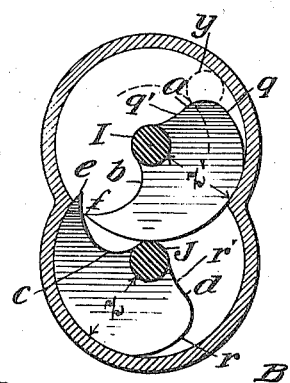
Fig. 10 is an end view of the same wheels illustrated in Fig. 4, showing the relative position of the wheels when the fluid has progressed sufficiently to turn the wheels on their axes through angles of 315 degrees.

Each of the helical pistons or blades has a periphery curved cylindrically to fit the corresponding surfaces of the casing, and also two unlike helical surfaces which extend from the shafts or hubs to the peripheries of the pistons. The "depth" of the tooth or blade is defined as the radial distance ($z$, $z'$ in Fig. 10) between the hub or shaft I or J and the outer or cylindrically curved surface of the blade or piston. The shape of these helical surfaces will be understood best by reference to their outline as it appears in any plane normal to the axes of the wheels. In one of the constructions illustrated by the drawings (Figs. 3, 4, 7 and 10), one of the helical surfaces of each piston exhibits a curved outline composed of a convex outer portion $q$ or $r$ and a concave inner portion $q'$ or $r'$. The said portion $q$ or $r$ is an epicycloid derived from a generating circle $y$ rolling on the outside of pitch-circle, said pitch-circle lying exactly half-way between the outer surface of the hub and the periphery of the piston. The concave portion $q'$ or $r'$ is a hypocycloid derived from a like generating circle rolling on the inside of the pitch-circle. The diameters of these generating circles are equal to one-half the depth of the tooth or blade. The other helical surfaces of the pistons or blades exhibit concave outlines or tooth profiles $b$, $c$ which are described by taking a point $e$ or $f$ (Figs. 4 and 10) on the circumference of one wheel and tracing it upon a plane normal to the axes of the wheels as the two pitch-circles roll together, i. e., as they are rotated with equal angular velocity in opposite directions.

Figure 4:
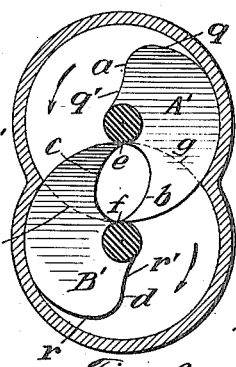
Fig. 4 is an end view of a pair of helical piston wheels showing the wheels fitted into a chamber which closely fits the perimeters of the wheels.

In Fig. 4, the crests (meaning the intersection of tooth outline with pitch circle) of curves $a$ and $d$, also the outer and inner points of curves $b$ and $c$, are on a straight line passing through the axes of wheels A and B.

If we take two plane figures formed as shown at A' and B', Fig. 4, and rotate them with uniform angular velocity in opposite directions, as indicated by the arrows, i. e., roll them upon their pitch-circles, then during one-half of the arc of action of tooth outlines $b$ and $c$, the outer point, $e$, of tooth outline $c$ of the plane figure B' will be in continuous contact with the tooth outline $b$ of the plane figure A', and the point of contact will describe in space the arc of a circle $g$. During the other half of the arc of action the outer point, $f$, of tooth outline $b$, of the plane figure A' will be in continuous contact with tooth outline $c$ of the plane figure B', and the point of contact will describe in space the arc of a circle $h$.

Figure 7:
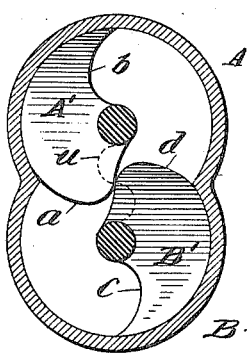
Fig. 7 is an end view of the same wheels illustrated in Fig. 4 showing the relative position of the wheels when the fluid has progressed sufficiently to turn the wheels on their axes through angles of 180 degrees.

During the arc of action of tooth outlines $a$ and $d$ there will be continuous contact from the root of the tooth of the plane figure A' to the root of the tooth of the plane figure B', and the point of contact will describe in space a curve $u$, Fig. 7.

If the two plane figures represented by A' and B', Fig. 4, be rotated with uniform angular velocities about their axes, A' in a clockwise direction and B' in a counter-clockwise direction, and at the same time advanced at a uniform rate along their axes until the figures have made two complete revolutions they will have generated the helices A and B shown in Figs. 5, 6, 8, 9, 11, 12, 1 and 2. The tooth outlines $a$, $b$, $c$ and $d$, Fig. 4, will have generated side surfaces $a'$, $b'$, $c'$ and $d'$, Figs. 5 and 6. The points $e$ and $f$, Fig. 4, will have generated the outer edges $e'$, Fig. 6, and $f'$, Fig. 5.

Figure 5:
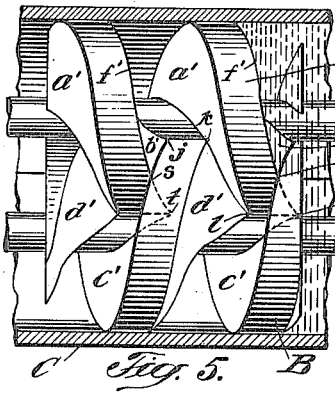
Fig. 5 is a side view of Fig. 4, with casing in section, showing the position of the fluid at the beginning of a cycle on the left side of the wheel chamber.
Figure 6:
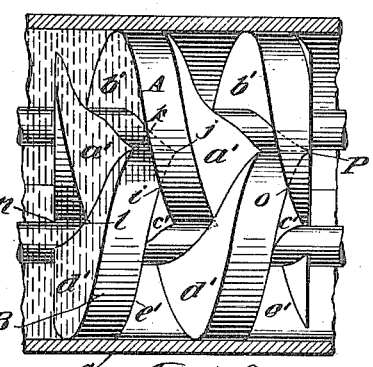
Fig. 6 is a side view of Fig. 4, with casing in section, looking from the right-hand side showing the position of the fluid at the beginning of the cycle on the right side of the wheel chamber.

It is apparent that helical teeth cut with these outlines will mesh, since a normal section taken anywhere between the ends will give outlines similar to A' and B', Fig. 4, and furthermore there will be simultaneous contact at different points between the side surfaces $a'$ and $d'$, Figs. 5 and 6, from the root or inner end of one tooth to the root of the other. This line of contact projected axially on a plane normal to the axes of the wheels would be as shown at $u$, Fig. 7; that is to say, while the line of contact progresses in a direction parallel to the axes, during the rotation of the piston, its axial projection remains at $u$ irrespective of such rotation.

The outer edge of said surface $c'$, that is to say, $e'$, Fig. 6, will be in simultaneous contact at successive points of the side surface $b'$ from a point $i$ at the intersection of the circumference of the two wheels to a point $j$ at the root of $b'$ on a plane passing through the axes of the wheels, similarly there will be simultaneous contact from analogous points $o$ to $p$.

These lines of contact projected on a plane normal to the axes of the wheels would be as shown at $g$, Fig. 4.

The outer edge of side surface $b'$, that is to say $f'$, Fig. 5, will be in simultaneous contact at successive points of the side surface $c'$ from a point $m$ at the intersection of the circumference of the two wheels to a point $n$ at the root of $c'$ on a plane passing through the axes of the wheels, similarly there will be simultaneous contact from analogous points $s$ to $t$. These lines of contact projected on a plane normal to the axes of the wheels would be as shown at $h$, Fig. 4.

The widths of the grooves at the root are the same as the widths of the outer surface of the teeth measured along lines parallel to the axes of the wheels. Also the cylindrical outer surface of one wheel is in sliding contact with the cylindrical root surface of the groove of the other wheel on a plane passing through the axes of the wheels.

With the helical piston wheels A and B in relative positions shown in Figs. 4, 5, and 6, fluid entering the chamber comes in contact and acts upon the tooth side surfaces $b'$ of wheel A and $d'$ of wheel B. Assuming for a moment that the wheels are stationary, then the fluid on the right-hand side of the chamber shown in Fig. 6 is unable to pass beyond the line of contact between the points $i$ and $j$ and is unable to pass into the outer side of the chamber shown in Fig. 5 by reason of the contact between the outer surface of wheel B and the root surface of wheel A between the points $j$ and $k$ and outer surface of wheel A and the root surface of wheel B between the points $l$ and $n$. The line contact between tooth surfaces $a'$ and $d'$ forms continuous contact between the points $k$ and $l$. The fluid on the left-hand side of the wheel chamber, shown in Fig. 5, is unable to pass beyond the line of contact between the points $m$ and $n$. The snug fitting sides of the case C prevent the passage of fluid between the outer surfaces of the wheels A and B and the case C.

Figure 8:
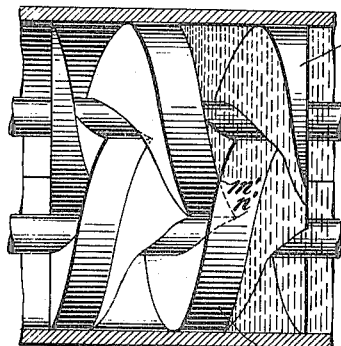
Fig. 8 is a side view of Fig. 7, with casing in section, looking from the left-hand side showing the position of the fluid on the left side of the wheel chamber.
Figure 9:
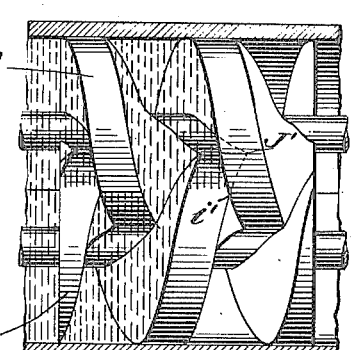
Fig. 9 is a side view of Fig. 7, with casing in section, looking from the right-hand side showing the position of the fluid on the right side of the wheel chamber.

If now it is assumed that the fluid acting upon the tooth side surfaces of wheels A and B is permitted to turn the wheels on their axes through angles of 180 degrees, then the fluid will advance to the lines of contact $i'—j'$ and $m'—n'$, Figs. 8 and 9.

Figure 11:
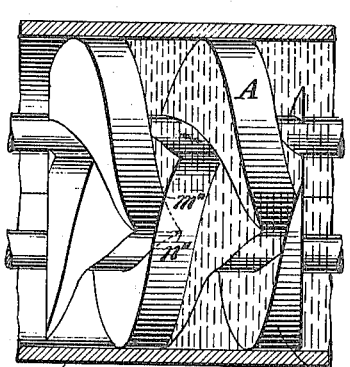
Fig. 11 is a side view of Fig. 10, with casing in section, looking from the left-hand side showing the position of the fluid on the left side of the wheel chamber.
Figure 12:
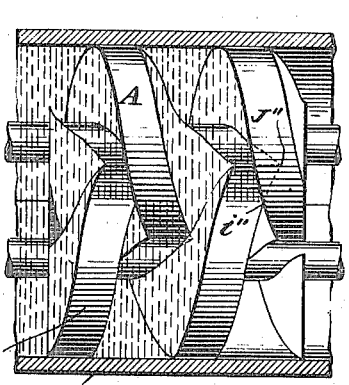
Fig. 12 is a side view of Fig. 10, with casing in section looking from the right-hand side showing the position of the fluid on the right side of the wheel chamber. When the wheels have completed a cycle or when each wheel has turned on its axis through an angle of 360 degrees the wheels are again in the relative positions shown in Fig. 4.

If the wheels A and B are turned on their axes through angles of 315 degrees, then the fluid will advance to the lines of contact $i''—j''$ and $m''—n''$, Figs. 11 and 12.

If the wheels A and B are turned on their axes through 360 degrees then the fluid will advance to the lines of contact $o—p$ and $s—t$, Figs. 6 and 5. The wheels will have made a complete revolution, and any further movement of the wheels will cause the fluid ahead of the lines of contact $i—j$ and $m—n$ to be displaced and pushed forward to the outlet.

It is apparent that if a fluid acts upon the tooth side surfaces of wheels A and B with sufficient pressure to overcome the resistances offered the wheels must turn on their axes, which is the condition obtaining in a motor or measuring apparatus.

Conversely if power is applied to the wheel shafts causing the wheels A and B to turn on their axes the tooth surfaces will act upon the fluid and the fluid will be drawn into the chamber and forced out on the opposite side, which is the condition obtaining in a pump.

It is also apparent that what has been designated the inlet side of the chamber may be the outlet side. The fluid pressure at any given point on the tooth side surface is normal to the surface on which it acts. This normal pressure may be resolved into two forces, one acting in a lateral direction tending to push the wheels in the direction of their axes, and the other in a direction tending to turn the wheels on their axes. If then two pairs of helical piston wheels are employed with right and left-hand helices on the same shaft at appropriate distances from each other and the inlet chest placed between the two pairs of wheels and the outlet chests at the other ends of the wheels, or vice versa, the lateral thrusts will balance, thereby reducing the wear on shaft bearings.

Figure 14:
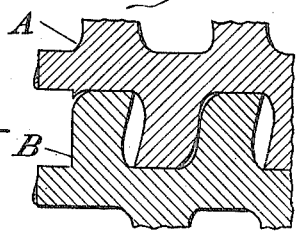
Fig. 14 is a partial section taken through the axes of both pistons.

As appears by Fig. 14, one helical surface of each piston is in tangential obstructing contact with the like helical surface of the other piston. The other helical surface of each piston is in obstructing contact with the outer edge of the helical surface of the same kind on the other piston. By "obstructing contact" I mean a contact such as will prevent leakage. It will also be observed that such contact extends from the hubs or shafts to the outer surfaces or peripheries of the pistons.

In Fig. 13 tooth outlines $v$ and $w$ accomplish the same purpose as tooth outlines $a$ and $d$ in the foregoing figures. During the arc of action there will be continuous contact from the root of one tooth to the root of the other. The faces or convex outer portions of outlines $v$ and $w$ are traced by taking a point on the pitch line of one wheel and tracing it upon the other wheel in a plane normal to the axes, as the two wheels roll upon their pitch circles. The flanks, or concave inner portions, of outlines $v$ and $w$ are formed by taking the outer points of the faces on the circumference of the wheels and tracing them upon planes normal to the axes of the wheels, as the two wheels roll upon their pitch-circles. The point of contact during the arc of action will describe in space a curve shown by dotted line x.

Referring now to Figs. 1 and 2, the fluid entering at R comes in contact with the surfaces of the screws A and B. The fluid has no other outlet except that furnished by the rotation of said screws. As the fluid to be measured passes through the chamber C to the outlet S it will continuously rotate wheels A and B and will carry over only a certain fixed quantity of fluid for each revolution of the screws.

The train of gears designated as T are reduction gears to allow the indication in convenient units of measure. The stuffing box U contains the means of connection between the train of gears and the external and visible register V. At W are shown spur gears to prevent wear on the tooth surfaces of wheels A and B, by preserving a proper angular relation between the two pistons. A screen X is placed at the inlet to the wheel chamber to prevent foreign matter from entering the interior.

Figs. 1 and 2 also show an improved connection between the register V and the helical piston wheels. On one of the shafts of the train of gears T is secured a disk T' preferably roughened by radial corrugations, and this friction disk is in driving engagement with a wheel V', preferably also roughened, which is mounted on the register V in such a manner as to be adjustable toward and from the center of the friction disk T'. For instance, as shown, the wheel V' may be screwed on the register shaft, nuts (not shown) or the like serving to hold the wheel after adjustment. By this construction a very delicate and accurate adjustment of the register indications can be obtained, so that the instrument will read correctly.

In the drawings I have shown one-tooth helical piston wheels with two convolutions of the threads. Helical piston wheels may be constructed with more than one tooth and with more than two convolutions of the threads and with any depth of thread. Wheels may also be of different diameters and speed ratios. The two pistons may have the same number of teeth or different numbers of teeth.

It will also be understood that while I have shown the utilization of the pair of helical piston wheels of my invention in connection with a fluid meter, by way of example, it is clear that the same inventive principle may be employed in other devices such as pumps and motors.

I claim as my invention:

1. In combination with a casing whose inner wall comprises two cylindrically-curved surfaces whose axes are parallel and located at a distance from each other smaller than the sum of the radii of said surfaces, and two piston wheels arranged within said casing to rotate about axes coinciding with those of said cylindrical surfaces, said wheels comprising central hubs and intermeshing helical pistons or blades of opposite pitch, the peripheries of which are curved cylindrically to fit the corresponding surfaces of the casing and to engage the hubs of the mating wheels, while the two helical surfaces of the same piston are unlike and have respectively convex and concave elements both in axial and in transverse section.

2. The combination of intermeshing helical pistons of opposite pitch mounted to rotate about parallel axes, each piston having an outer surface of cylindrical curvature and two unlike helical surfaces which have respectively convex and concave elements both in axial and in transverse section, like helical surfaces of the two pistons being in obstructing contact with each other, and a casing whose inner wall conforms to the paths of the outer surfaces of said pistons.

3. The combination of intermeshing helical pistons of opposite pitch mounted to rotate about parallel axes, each piston having an outer surface of cylindrical curvature and two unlike helical surfaces which have respectively convex and concave elements both in axial and in transverse section, and a casing whose inner wall conforms to the paths of the outer surfaces of said pistons.

4. The combination of intermeshing helical pistons of opposite pitch mounted to rotate about parallel axes, each piston having an outer surface of cylindrical curvature and two unlike helical surfaces, like helical surfaces of the two pistons being in tangential obstructing contact with each other, and a casing whose inner wall conforms to the paths of the outer surfaces of said pistons.

5. The combination of intermeshing helical pistons of opposite pitch mounted to rotate about parallel axes, each piston having an outer surface of cylindrical curvature and two unlike helical surfaces, like helical surfaces of the two pistons being in continuous obstructing line contact with each other, and a casing whose inner wall conforms to the paths of the outer surfaces of said pistons.

6. The combination of intermeshing helical pistons of opposite pitch mounted to rotate about parallel axes, each piston having an outer surface of cylindrical curvature and two unlike helical surfaces, adjoining helical surfaces of the two pistons being in continuous obstructing line contact with each other, and a casing whose inner wall conforms to the paths of the outer surfaces of said pistons.

7. The combination of intermeshing helical pistons of opposite pitch mounted to rotate about parallel axes, each piston having an outer surface of cylindrical curvature and two unlike helical surfaces, adjoining helical surfaces of the two pistons being in obstructing contact with each other along continuous lines which shift in an axial direction as the pistons rotate, the axial projections of said lines being constant, and a casing whose inner wall conforms to the paths of the outer surfaces of said pistons.

8. The combination of intermeshing helical pistons of opposite pitch mounted to rotate about parallel axes, each piston having an outer surface of cylindrical curvature and two unlike helical surfaces, adjoining helical surfaces of the two pistons being in continuous obstructing contact with each other along lines extending from the inner ends of such surfaces continuously to their outer ends or peripheries, and a casing whose inner wall conforms to the paths of the outer surfaces of said pistons.

9. The combination of intermeshing helical pistons of opposite pitch mounted to rotate about parallel axes, each piston having an outer surface of cylindrical curvature and two unlike helical surfaces, the contacting helical surfaces of the two pistons being of the same kind, one of the helical surfaces of each pair exhibiting, in any section perpendicular to the axes, a curved outline composed of a convex outer portion and a concave inner portion, while the other helical surface of the pair, in any section perpendicular to the axes, exhibits a concave outline, and a casing whose inner wall conforms to the paths of the outer surfaces of said pistons.

10. The combination of intermeshing helical pistons of opposite pitch mounted to rotate about parallel axes, each piston having an outer surface of cylindrical curvature and two unlike helical surfaces, the contacting helical surfaces of the two pistons being of the same kind, one of the helical surfaces of each pair exhibiting, in any section perpendicular to the axes, a curved outline, whose convex outer portion is an epicycloid and whose concave inner portion is a hypocycloid derived from a circle of like diameter rolling on the same pitch circle, while the other helical surface of each pair, in any section perpendicular to said axes, exhibits a concave outline, and a casing whose inner wall conforms to the paths of the outer surfaces of said pistons.

11. The combination of intermeshing helical pistons of opposite pitch mounted to rotate about parallel axes, each piston having an outer surface of cylindrical curvature and two unlike helical surfaces, the contracting helical surfaces of the two pistons being of the same kind, one of the helical surfaces of each pair exhibiting, in any section perpendicular to the axes, a curved outline, whose convex outer portion is an epicycloid and whose concave inner portion is a hypocycloid derived from a circle of like diameter rolling on the same pitch circle, while the other helical surface of each pair, in any section perpendicular to said axes, exhibits a concave outline, derived by tracing upon one of the pistons, the path described by a point on the periphery of the other piston during the simultaneous rotation of the two pistons, and a casing whose inner wall conforms to the paths of the outer surfaces of said pistons.

12. The combination of intermeshing helical pistons of opposite pitch mounted to rotate about parallel axes, each piston having an outer surface of cylindrical curvature and two unlike helical surfaces, the helical surface of one kind on one of the pistons engaging the helical surface of the same kind on the other piston, one of the helical surfaces of each pair exhibiting, in any section perpendicular to the said axes, an outline the outer portion of which forms a convex curve, while the other helical surface of the pair, in any such section perpendicular to the axes, exhibits a concave outline, the peripheral extremities of the last-named concave curves on the two pistons being arranged to reach at the same moment, a line passing in said plane through the said axes of rotation, and a casing whose inner wall conforms to the paths of the outer surfaces of said pistons.

13. The combination of intermeshing helical pistons of opposite pitch mounted to rotate about parallel axes, each piston having an outer surface of cylindrical curvature and two unlike helical surfaces, the helical surface of one kind on one of the pistons engaging the helical surface of the same kind on the other piston, one of the helical surfaces of each pair exhibiting, in any section perpendicular to the said axes, a curved outline composed of a convex outer portion and a concave inner portion, while the other helical surface of the pair, in any such section perpendicular to the axes, exhibits a concave outline, the peripheral extremities of the last-named concave curves on the two pistons being arranged to reach at the same moment, a line passing in said plane through the said axes of rotation, and a casing whose inner wall conforms to the paths of the outer surfaces of said pistons.

14. The combination of intermeshing helical pistons of opposite pitch mounted to rotate about parallel axes, each piston having an outer surface of cylindrical curvature and two unlike helical surfaces, one helical surface of each piston being in obstructing contact with the like helical surface of the other piston, while the other helical surface of each piston is in obstructing contact with the outer edge of the helical surface of the same kind on the other piston.

15. The combination of intermeshing helical pistons of opposite pitch mounted to rotate about parallel axes, each piston having an outer surface of cylindrical curvature and two unlike helical surfaces, the contacting helical surfaces of the two pistons being of the same kind, one of the helical surfaces of each pair exhibiting, in any section perpendicular to the axes, a curved outline whose convex outer portion is an epicycloid and whose concave inner portion is a hypocycloid, both said epicycloid and said hypocycloid being derived from a circle whose diameter is equal to one-half the radial depth of the piston, rolling on the same pitch circle, while the other helical surface of each pair, in any section perpendicular to said axes, exhibits a concave outline, and a casing whose inner wall conforms to the paths of the outer surfaces of said pistons.

In testimony whereof, I have hereunto set my hand this 23d day of July, 1915.

EDWARD NUEBLING.